United States Patent [19]

Supe-Dienes et al.

[11] Patent Number: 5,237,900
[45] Date of Patent: Aug. 24, 1993

[54] STRAIGHT-LINE CUTTING MACHINE WITH CUTTING MAGAZINE

[75] Inventors: Rudolf Supe-Dienes; Erhardt Huhn; Hermann Jeremies, all of Overath, Fed. Rep. of Germany

[73] Assignee: Dienes Werke für Maschinenteile GmbH & Co. KG, Overath-Vilkerath, Fed. Rep. of Germany

[21] Appl. No.: 843,375

[22] Filed: Feb. 28, 1992

[30] Foreign Application Priority Data

Mar. 1, 1991 [DE] Fed. Rep. of Germany ....... 4106494

[51] Int. Cl.[5] .................. B26D 3/12; B26D 7/26
[52] U.S. Cl. .................. 83/563; 83/425.3; 83/506; 83/507; 83/508.1; 83/508.3; 83/700
[58] Field of Search .............. 83/505, 506, 507, 508.1, 83/508.3, 588, 676, 700, 858, 425.3, 563

[56] References Cited

U.S. PATENT DOCUMENTS

| | | | |
|---|---|---|---|
| 1,510,656 | 10/1924 | Clemens | 83/481 |
| 1,687,607 | 10/1928 | Collins | 83/506 |
| 1,695,715 | 12/1928 | Merrick | 83/506 |
| 1,900,183 | 3/1933 | Johnstone | 83/505 |
| 2,796,933 | 6/1957 | De Gelleke | 83/506 |
| 3,892,156 | 7/1975 | Johnstone | 83/508.1 |
| 3,921,488 | 11/1975 | Mastriani et al. | 83/481 |
| 3,977,284 | 8/1976 | Mastriani et al. | 83/698 |
| 4,741,234 | 5/1988 | Colombo | 83/481 |
| 4,819,528 | 4/1989 | Chadwick | 83/508.3 |

FOREIGN PATENT DOCUMENTS 2340804  2/1979  Fed. Rep. of Germany .

Primary Examiner—Hien H. Phan
Attorney, Agent, or Firm—Robert W. Becker & Associates

[57] ABSTRACT

A straight-line cutting machine is comprised of a transverse holding device and at least one cutting magazine consisting of a plurality of knife holders. The cutting magazine is connected to the transverse holding device, whereby the knife holders are spaced at a fixed distance relative to one another. Each knife holder is provided with an individually controllable drive so that each of the pressing knives may be raised and lowered individually. By providing cutting magazines with pressing knives that are spaced from one another at a fixed distance, it is possible to adjust the cutting width in a simple manner and with greater accuracy.

17 Claims, 4 Drawing Sheets

STRAIGHT-LINE CUTTING MACHINE WITH CUTTING MAGAZINE

BACKGROUND OF THE INVENTION

The present invention relates to a straight-line cutting machine having a transverse holding device for receiving knife holders with which the individual knives, via a drive connected to the knife holder, may be positioned at a counter roller.

A straight-line cutting machine of the aforementioned kind has been known from German patent 23 40 804 in which individual pressing knives are disclosed as components of a straight-line cutting machine which is designed for especially small cutting widths. With this device, each individual knife holder must be placed onto the transverse holding device of the straight-line cutting machine, must then be adjusted to a respective cutting position and fastened to the transverse holding device by a respective fastening means which is driven by a screw.

With this known arrangement of knife holders of a straight-line cutting machine, it is a well-known problem that the adjustment of the knife holders to the desired cutting width is very time consuming and difficult. Each individual knife holder must be fastened in its respective adjusted position at the transverse holding device, whereby it must be taken into consideration that the knife holders are positioned at an angle to the transverse holding device in order to ensure the required exact cutting width which is determined by the distance between the knives of the knife holders. Even when carefully executing the adjustment and fastening of the individual knife holders, the addition of the tolerances (play) of the individual knife holders, due to their construction and fastening at the transverse holding device, a disadvantageous inaccuracy of the cutting width results for a straight-line cutting machine with a plurality of knife holders.

It is therefore an object of the present invention to provide a straight-line cutting machine with which the adjustment of the cutting width of the coordinated knife holders is facilitated, while, at the same time, the accuracy is increased.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
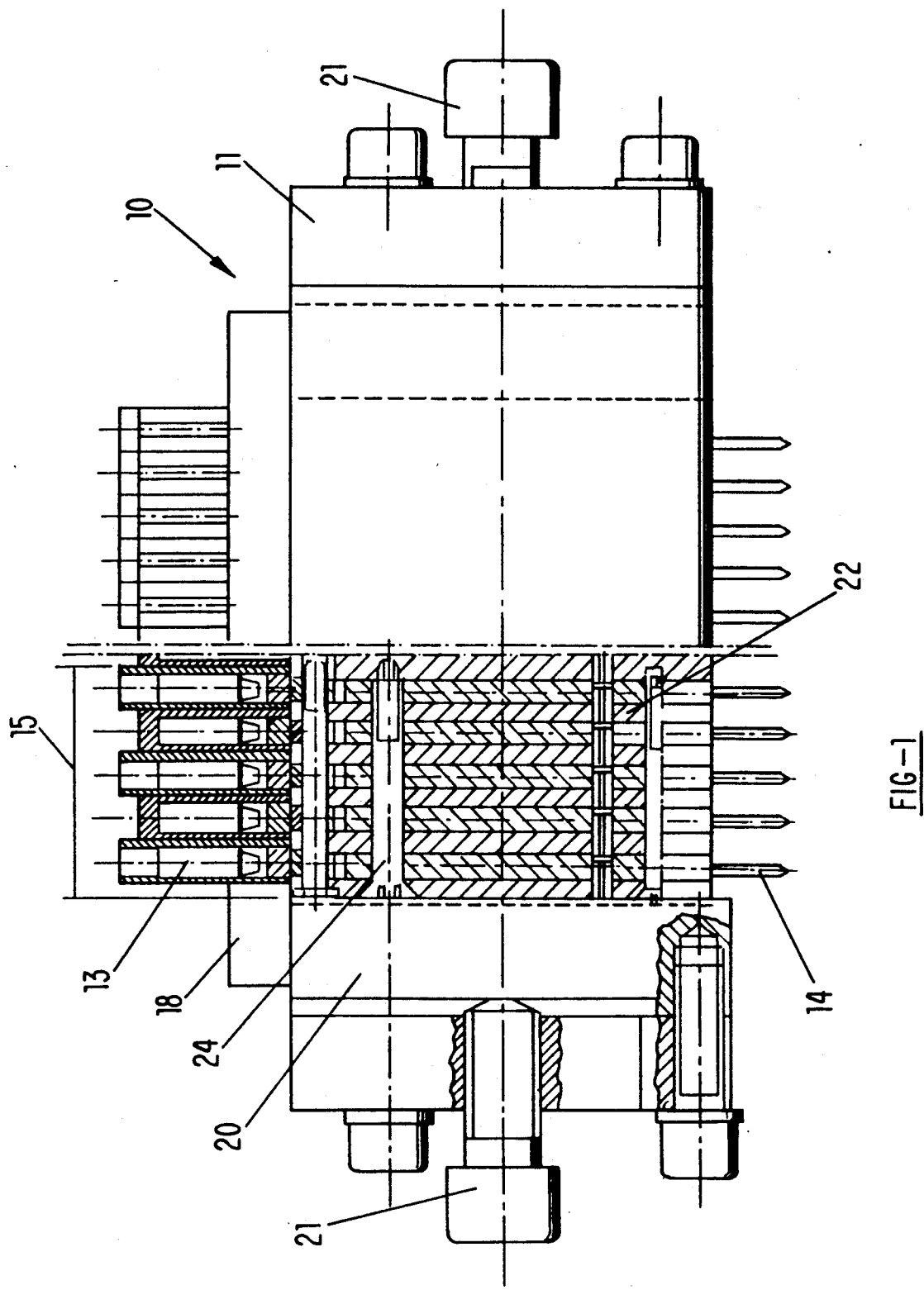
FIG. 1 shows a frame with a cutting magazine as a part of a straight-line cutting machine in a partly sectioned side view.
Figure 2:
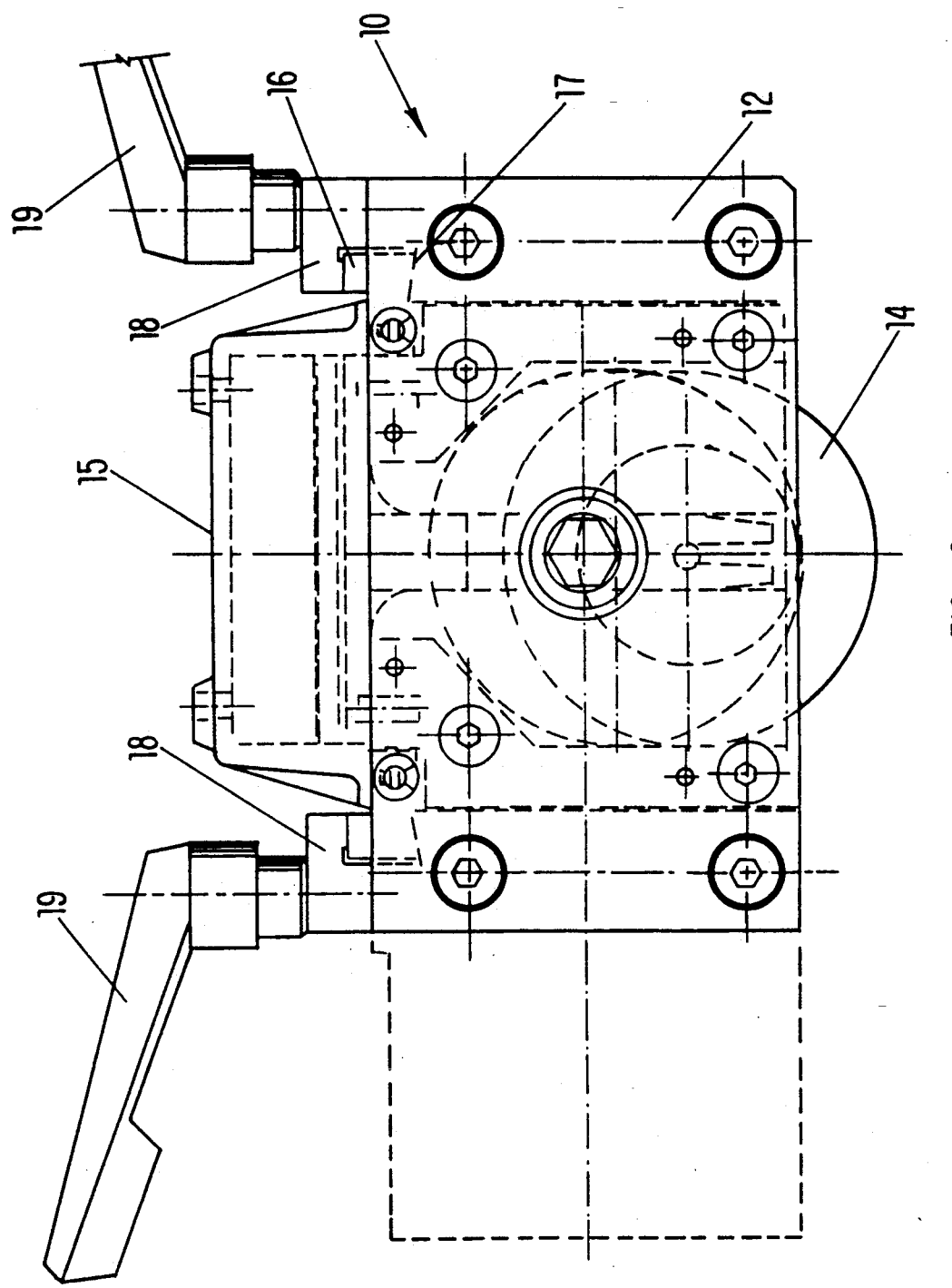
FIG. 2 shows the cutting machine of FIG. 1 in a cross-sectional view.

The straight-line cutting machine of the present invention is primarily characterized by a transverse holding device; at least one cutting magazine comprised of a plurality of knife holders, the cutting magazine being connected to the transverse holding device, with the knife holders being spaced at a fixed distance relative to one another; a pressing knife connected to each of the knife holders; and a drive means connected to the knife holders for raising and lowering the pressing knives.

The basic solution of the present invention is to combine a plurality of adjacent knife holders with a fixed distance relative to one another in a cutting magazine, whereby the resulting cutting magazine forms a single component which may be positioned and fastened to the transverse holding device. With such an embodiment of a straight-line cutting machine, it is advantageous that due to the substantially increased accuracy of the adjustment of the plurality of knife holders as a single component in the form of a cutting magazine allows to observe prescribed cutting widths with a very narrow tolerance margin. Since the individual knife holders with the corresponding pressure knives are integrated into the cutting magazine at a fixed distance, any further adjustment after the attachment of the cutting magazine to the transverse holding device is obsolete.

A further advantage is that a change to another desired cutting width is facilitated with the inventive cutting machine, because the knife holders of the cutting magazine must not be dissassembled and readjusted to a different cutting width, but can simply be exchanged for may simply a further cutting magazine kept in storage which is preadjusted to a certain required cutting width.

In a preferred embodiment of the present invention the drive means is comprised of individually controllable drive for each one of the pressing knives so that each pressing knife may be raised and lowered individually. Each individual knife holder of a cutting magazine is thus provided with an individual drive for adjusting the individual knife position in order to compensate for different knife diameters resulting from the periodically required sharpening of the knives.

The cutting magazine, in a further embodiment of the present invention, may be comprised of a solid block made from a suitable material and having recesses for receiving the knife holders together with the drive means and the pressing knives. Due to the block-like embodiment of the cutting magazine, the positioning of the individual knife holders is ensured with the required accuracy.

As an alternative, it is also possible to provide a plurality of conventional knife holders comprised of a housing with housing walls, whereby the housing of the individual knife holders are fixedly connected to one another to form the cutting magazine as an integral component. It is especially preferred that neighboring ones of the knife holders are connected to one another by a common housing wall.

It is further possible to provide spacing elements connected between the housing walls of neighboring ones of the knife holders, for increasing a distance between the pressing knifes. When assembling the individual knife holders to build a cutting magazine the spacing elements are arranged between the housing walls of neighboring knife holders and are connected thereto so that in the assembled state a fixedly connected cutting magazine is formed as an integral component, in which the cutting width has been increased by the spacing elements.

In a preferred embodiment of the present invention, the transverse holding device is a rectangular frame having parallel longitudinal supports, and the cutting magazine further comprises cogs and is insertable into the frame, whereby the cogs rest on the supports in the inserted position of the cutting magazine. In order to fixedly connect the cutting magazine to the frame, the frame is further comprised of longitudinal bars connected in a vertically slidable manner to the support, and clamping levers connected to the bars, the clamping levers moving the bars into engagement with the cogs in the inserted position and fasten the bars at the cogs so that the cutting magazine is fixedly connected to the frame.

It is especially preferred that the frame receives a plurality of cutting magazines with respectively arranged pressing knives such that the cutting magazines are arranged adjacent to one another.

In this context, it is especially advantageous to provide pressure plates slidably connected to end faces of the rectangular frame and a clamping device connected to each one of the pressure plates for clamping a plurality of cutting magazines in the inserted position within the frame in order to form a cutting block with constant cutting widths. The clamping device may be in the form of threaded screws or a pneumatically, respectively, hydraulically operated pressing device which slide the pressure plates towards the cutting magazines to thereby clamp the cutting magazines relative to one another into one single cutting block with respectively equal cutting widths over the entire length. This is especially advantageous since the clamping force exerted by the pressure plates contact only the outer portions of the two outwardly arranged cutting magazines so that the function of the individual knife holders in each individual cutting magazine is not impaired with respect to the vertical lifting movement and the simultaneous displacement of the individual knifes, and a jamming of the individual knives is prevented in an advantageous manner.

It is expedient that the length of the frame be slightly greater than a length of the cutting magazine, respectively, an overall length of a plurality of the cutting magazines (one cutting block). This is advantageous because the cutting magazine, respectively, a cutting block made of a plurality of cutting magazines may be moved over the given play so that an exact adjustment with respect to the counter roller of the cutting machine may be accomplished.

In as far as the straight-line cutting machines are not provided with the transverse holding device in the form of a frame according to the present invention, it is possible to retrofit existing straight-line cutting machines according to the present invention by providing the frame for receiving the individual cutting magazines as a separate component and to further provide respective supporting means for connecting the frame to the transverse beam of a conventional straight-line cutting machine. The cutting magazine, as described above, has cogs and rests with these cogs on the supports of the frame in its inserted position.

It is preferable that the parts of the knife holder may be individually and simply removed from the respective housing walls forming the cutting magazine. Thus, it is provided that the drive of each individual knife holder is comprised of an individually controllable drive so that each of the pressing knives is raised and lowered individually, the individual controllable drive being comprised of a cover in the form of a cylinder having a piston arranged therein, the piston being displaceable within the cylinder and between the housing walls, the housing walls having grooves and the knife holder further comprising a U-shaped knife support longitudinally slidably connected with the grooves, whereby the piston, i.e., a projection thereof, is releasably connected to a recess of the knife support in a form-locking manner. The piston is actuatable by a pressure medium. This embodiment is advantageous because the cover, respectively, cylinder may be removed from the top of the housing so that the piston is easily accessible. This is important because the components of the drive and the guide system of the knife holder as well as the pressing knife itself are subject to wear. Since the piston is releasably connected in a form-locking manner to the knife support the knife holder together with the pressing knife may be removed in a simple manner (the knife support is guided at the grooves of the housing walls).

In another embodiment of the present invention, spring-loaded rocker arms are provided for fastening the cover, respectively, the cylinder to the housing wall. Furthermore it is suggested that a sealing collar connected to the piston is provided for sealing the piston against the cover. The piston is preferably spring-loaded into a position corresponding to the cutting position of the pressing knife. With these measures, a simple embodiment of the drive for the required movement of the knife holder is realized.

In a further embodiment of the present invention, the piston has a projection and the knife support has a recess, the projection engaging the recess in a form-locking manner and further comprising a spring for pressing the projection into the recess. With this embodiment, it is advantageously possible that the piston be simply released from the knife holder by a lateral release movement so that, on the one hand, the piston may be removed from the frame, respectively, on the other hand, the knife holder may be removed from the frame in a downward direction.

Furthermore, it is expedient that the pressing knife has a spindle and gliding projections, and the knife support has two legs, with an end of the legs opposite the piston having a slot for receiving and arresting the spindle of the pressing knife, whereby the pressing knife is glidingly supported with the aforementioned gliding projections at inner sides of the legs of the knife support. Essentially, the gliding projections from a journal for the pressing knife. With this embodiment the supporting surface for the rotation of the pressing knives is no longer provided at the inner side walls of the housing walls, but the pressing knives are now supported at the inner sides of the knife holder so that the easily exchangeable knife holders undergo common wear, while the housing of the knife holder is no longer subject to any wear.

DESCRIPTION OF PREFERRED EMBODIMENTS

The present invention will now be described in detail with the aid of several specific embodiments utilizing FIGS. 1 through 4.

FIG. 1 represents the arrangement of knife holders for a straight-line cutting machine (not represented in detail in the drawing), at a respective transverse holding device whereby the corresponding counter roller is not represented.

The straight-line cutting machine is provided with a rectangular frame 10 (viewed in a plan view) which represents the transverse holding device. The frame 10 is provided with end faces 11 and with longitudinal supports 12 arranged between these end faces. In the represented embodiment the cutting magazine 15 is comprised of five knife holders 13 with corresponding pressing knives 14.

In the represented embodiment, two cutting magazines 15 are inserted into the frame 10 and are supported at laterally projecting cogs 16 resting on the supports 12 of the frame 10. The frame 10 has dovetailed cutouts 17 for receiving the cogs 16. With this arrangement a centering of the cutting magazines 15 at the frame 10 is improved. Vertically slidable bars 18 rest on the supports 12 and are movable by clamping levers 19 so that, after the insertion of the cutting magazines 15 which rest with their cogs 16 at the supports 12, the bars 18 may be pressed onto the cogs 16 to thereby fixedly arrest the cutting magazines 15 within the frame 10.

At the end faces 11 of the frame 10, pressure plates 20 are provided which are slidable via threaded screws 21 in the axial direction of the frame 10. The cutting magazines 15 are inserted into the frame between the pressure plates 20 arranged at the end faces 11 and are clamped relative to one another via the threaded screws 21 within the frame 10. Instead of the threaded screws 21, a pneumatic or hydraulic pressing device may be provided. The interior dimensions of the frame 10 are slightly greater than a plurality of the dimensions of an individual cutting magazine 15 so that a sufficient play for inserting, respectively, exchanging the cutting magazines 15 as well as for adjusting the position of a cutting block comprised of a plurality of cutting magazines 15 is provided.

Figure 3:
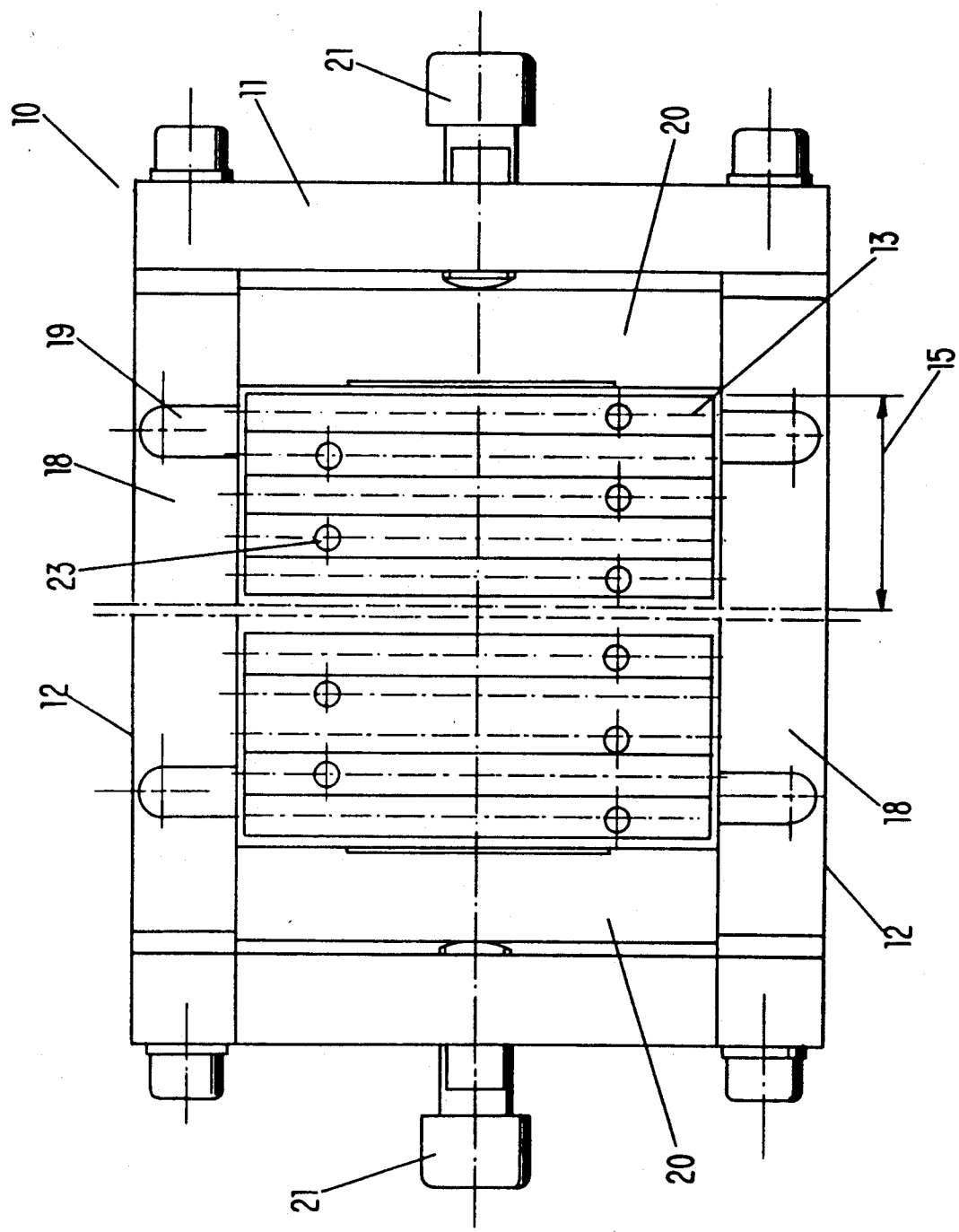
FIG. 3 shows the cutting machine of FIG. 1 in a plan view.

As can be seen especially in FIG. 1 an individual cutting magazine 15 is formed by connecting conventional knife holders 13 which between them have only one housing wall 22 and which are fastened relative to one another by a screw 24 penetrating all five knife holders 13. Between the individual housing walls 22, the drives for the vertical movement of the pressing knives 14 are arranged in a conventional manner, and the corresponding controlling connections 23 for the drives are shown in FIG. 3.

Figure 4:
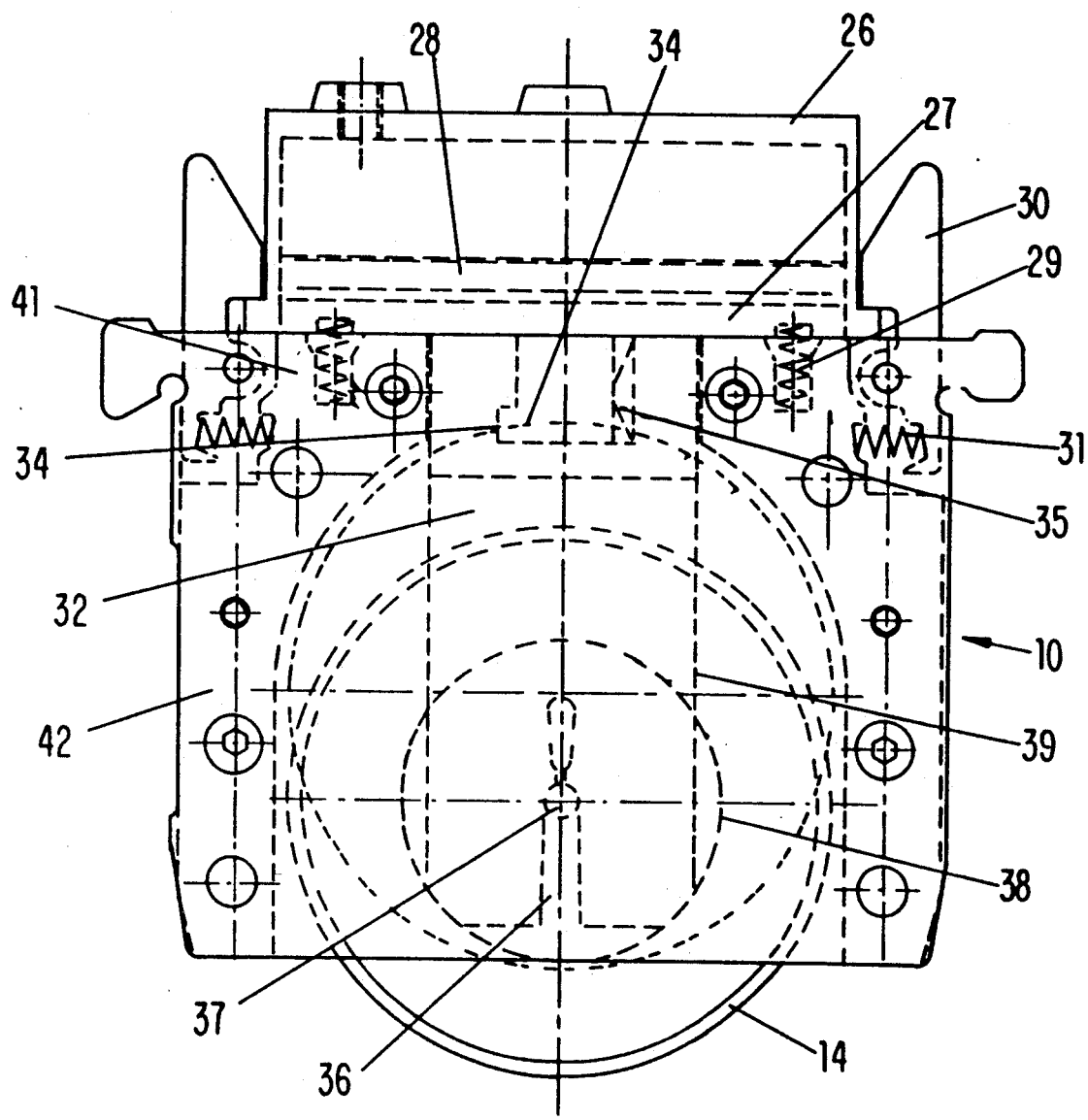
FIG. 4 shows an individual knife holder with a quick-release device in a representation corresponding to FIG. 2.

FIG. 4 shows in detail the embodiment of each individual knife holder 13 inserted into the frame 10 such that an exchange of the parts undergoing wear such as the piston, respectively, the piston seal, the knife holder and the journal of the knife is possible. For this purpose, the cylinder of the drive is provided in the form of a cover 26 positioned on the lateral housing walls 22. The cover 26 has projections 41 at its end faces which engage the lateral housing walls 22 whereby the end faces between the lateral housing walls 22 are closed off by respective inserts 42. In the interior of the cover 26 an essentially rectangular piston 27 is arranged in a movable manner between the housing walls 22 whereby the piston is sealed against the cover 26, respectively, the housing walls 22 by a sealing collar 28. The piston 27 is loaded into a position which corresponds to the lowered working or cutting position of the pressing knives 14 by laterally arranged springs 29 so that the supply of a pressure medium, preferably, compressed air, is necessary only to move the pressing knife 14 into its raised position.

The cover 26 is connected to the frame 10 in a releasable manner via rocker arms 30 which are loaded into their arresting position by springs 31.

The lateral housing walls 22 are provided with grooves 39 in which the U-shaped knife support 32 is arranged as to be slidable in a longitudinal direction. The knife support 32 at its upper end is provided with a recess 33 which is engaged by a respective projection 34 of the piston 27 so that a form-locking connection between the knife support 32 and the piston 27 results. In this position, the piston 27 is loaded by a pressure spring 35 such that a lateral movement which frees the projection 34 from the recess 33 results in the release of the connection.

The two legs of the U-shaped knife support 32 which are guided at the lateral housing wall 22 are provided at their lower end with a respective slot 36 for receiving the spindle 37 of the pressing knife 14, whereby the slots 36 are embodied such that the spindle 37 is arrestable in the slots 36. The pressing knife 14 is further provided with circular projections 38 which together with the inner sides of the legs of the knife support 32 form a respective journal for the pressing knifes 14. The shape of the U-shaped knife support 32 in the area of the projections 38 of the pressing knife 14 may be adapted to the embodiment of the projections 38 such that the entire surface area of the projections 38 contact the inner side of the legs of the knife support 32. This is not represented in detail in the drawings.

The present invention is, of course, in no way restricted to the specific disclosure of the specification and drawings, but also encompasses any modifications within the scope of the appended claims.

What we claim is:

1. A straight-line cutting machine comprising:
   a transverse holding device;
   at least one cutting magazine comprised of a plurality of knife holders, said cutting magazine being connected to said transverse holding device, with said knife holders being spaced at a fixed distance relative to one another;
   a pressing knife connected to each of said knife holder; and
   a drive means connected to said knife holders for raising and lowering said pressing knives; and
   wherein said transverse holding device is a rectangular frame having parallel longitudinal supports, and said cutting magazine further comprises cogs and is insertable into said frame, with said cogs resting on said supports in an inserted position of said cutting magazine.

2. A straight-line cutting machine according to claim 1, wherein said drive means is comprised of an individually controllable drive for each of said pressing knives so that each of said pressing knives is raised and lowered individually.

3. A straight-line cutting machine according to claim 1, wherein said cutting magazine is comprised of a solid block having recesses for receiving said knife holders together with said drive means and said pressing knives.

4. A straight-line cutting machine according to claim 1, wherein each of said knife holders is comprised of a housing with housing walls, said housings of said knife holders being fixedly connected to one another to form said cutting magazine.

5. A straight-line cutting machine according to claim 4, wherein neighboring ones of said knife holders are connected to one another by one common housing wall.

6. A straight-line cutting machine according to claim 4, further comprising spacing elements, connected between said housing walls of neighboring ones of said knife holders, for increasing a distance between said pressing knives.

7. A straight-line cutting machine according to claim 4, wherein said drive means is comprised of an individually controllable drive for each of said pressing knives so that each of said pressing knives is raised and lowered individually, said individual controllable drive being comprised of a cover in the form of a cylinder having a piston arranged therein, said piston being displaceable within said cylinder and between said housing walls, said housing walls having grooves and said knife holder further comprising a U-shaped knife support longitudinally slidably connected with said grooves, with said piston being releasably connected to said knife support in a form-locking manner.

8. A straight-line cutting machine according to claim 7, further comprising spring-loaded rocker arms for fastening said cover to said housing walls.

9. A straight-line cutting machine according to claim 7, further comprising a sealing collar connected to said piston for sealing said piston against said cover, and wherein said piston is spring-loaded into a position corresponding to a cutting position of said pressing knife.

10. A straight-line cutting machine according to claim 7, wherein said piston has a projection and said knife support has a recess, said projection engaging said recess in said form-locking manner, and further comprising a spring for pressing said projection into said recess.

11. A straight-line cutting machine according to claim 7, wherein said pressing knife has a spindle and gliding projections, and said knife support has two legs, with an end of said legs opposite said piston having a slot for receiving and arresting said spindle, said pressing knife being glidingly supported with said gliding projections at inner sides of said legs of said knife support.

12. A straight-line cutting machine according to claim 1, wherein said frame is further comprised of longitudinal bars connected in a vertically slidable manner to said supports, and clamping levers connected to said bars, said clamping levers moving said bars into engagement with said cogs in said inserted position and fastening said bars at said cogs.

13. A straight-line cutting machine according to claim 1, wherein said frame receives a plurality of said cutting magazines such that said cutting magazines are arranged adjacent to one another.

14. A straight-line cutting machine according to claim 13, further comprising pressure plates slidably connected to end faces of said rectangular frame and a clamping device connected to each of said pressure plates for clamping said cutting magazines in said inserted position.

15. A straight-line cutting machine according to claim 1, wherein a length of said frame is slightly greater than a length of said cutting magazine.

16. A straight-line cutting machine according to claim 1, wherein a length of said frame is slightly greater than an overall length of a plurality of said cutting magazines.

17. A straight-line cutting machine according to claim 1, wherein said cutting machine has a transverse beam and said transverse holding device is comprised of a rectangular frame having parallel longitudinal supports, and a supporting means for connecting said frame to said transverse beam, and wherein said cutting magazine further comprises cogs and is insertable into said frame, with said cogs resting on said supports in an inserted position of said cutting magazine.

* * * * *